US006221448B1

(12) United States Patent
Baetzold et al.

(10) Patent No.: US 6,221,448 B1
(45) Date of Patent: *Apr. 24, 2001

(54) COLD SEAL COMPOSITIONS COMPRISING HOMOGENEOUS ETHYLENE POLYMERS

(75) Inventors: John P. Baetzold, North St. Paul; Robert G. Polance, Lino Lakes; Michelle M. Chanak, Forest Lake, all of MN (US)

(73) Assignees: H. B. Fuller Licensing & Financing, Inc.; The Dow Chemical Company

( * ) Notice: Subject to any disclaimer, the term of this patent is extended or adjusted under 35 U.S.C. 154(b) by 0 days.

This patent is subject to a terminal disclaimer.

(21) Appl. No.: 09/200,667

(22) Filed: Nov. 25, 1998

Related U.S. Application Data

(63) Continuation-in-part of application No. PCT/US97/12366, filed on Jul. 21, 1997.
(60) Provisional application No. 60/066,813, filed on Nov. 26, 1997, provisional application No. 60/022,538, filed on Jul. 22, 1996, and provisional application No. 60/044,909, filed on Apr. 25, 1997.

(51) Int. Cl.[7] .................................................. B65D 27/14
(52) U.S. Cl. ................ 428/35.2; 428/34.3; 428/355 AC; 428/355 EN; 428/355 BL; 428/523; 229/80; 525/88; 525/240; 526/348; 526/943
(58) Field of Search .................................... 524/502, 504, 524/478, 474; 525/240, 88; 526/943, 348; 428/355 AC, 355 EN, 355 BL, 34.2, 515, 35.2, 523; 229/80

(56) References Cited

U.S. PATENT DOCUMENTS

| 5,397,843 | 3/1995 | Lakshmanan et al. | 525/240 |
| 5,530,054 | 6/1996 | Tse et al. | 524/474 |
| 5,548,014 | 8/1996 | Tse et al. | 524/477 |

FOREIGN PATENT DOCUMENTS

| 0 531 618 | 3/1993 | (EP) . |
| WO 97/33921 | 9/1997 | (WO) . |
| WO 98/03603 | * 1/1998 | (WO) . |

OTHER PUBLICATIONS

"A New Family of Linear Ethylene Polymers Provides Enhanced Sealing Performance" Tapi Journal pp 100–102, Feb. 1992.*

* cited by examiner

Primary Examiner—Paul Thibodeau
Assistant Examiner—D. Lawrence Tarazano
(74) Attorney, Agent, or Firm—Nancy N. Quan

(57) ABSTRACT

The present invention is a cold seal composition having certain rheological properties. The composition comprises from about 10 wt-% to 100 wt-% of at least one homogeneous ethylene/α-olefin interpolymers. The novel adhesive compositions of the present invention may be coated onto a variety of substrates, resist blocking upon being supplied as a roll-good, and exhibit a wide range of bond strengths, amenable to a variety of cold seal bonding applications.

19 Claims, 1 Drawing Sheet

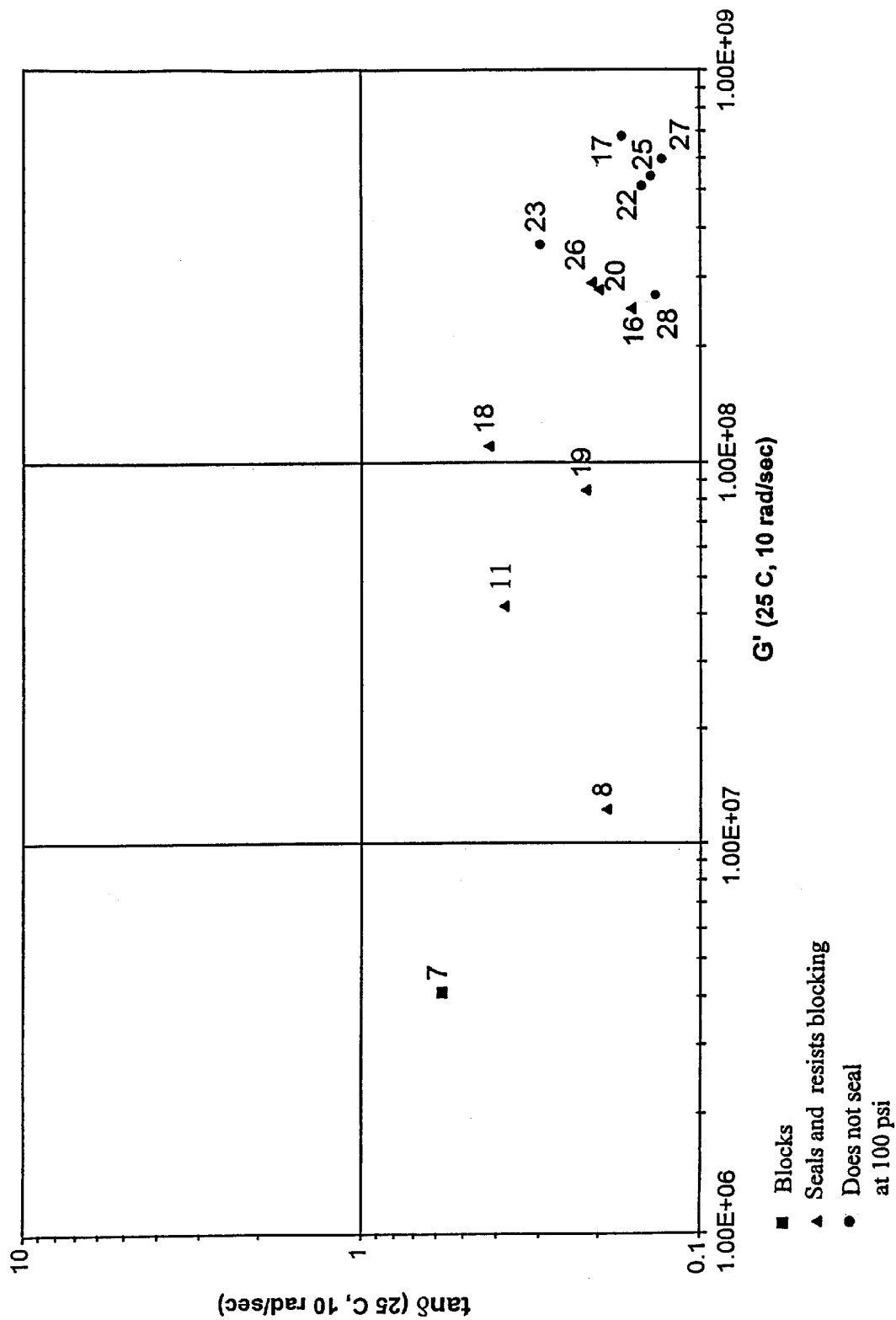

COLD SEAL COMPOSITIONS COMPRISING HOMOGENEOUS ETHYLENE POLYMERS

RELATED APPLICATIONS

This application is a Continuation-In-Part of provisional patent application Ser. No. 60/066813 filed Nov. 26, 1997 and a Continuation-In-Part of PCT patent application Ser. No. U.S. 97/12366 filed Jul. 21, 1997 which claims priority to provisional patent applications 60/022,538 filed Jul. 22, 1996 and 60/044,909 filed Apr. 25, 1997.

FIELD OF THE INVENTION

The present invention is a cold seal composition having certain rheological properties. The composition comprises from about 10 wt-% to 100 wt-% of at least one homogeneous ethylene/α-olefin interpolymer. The novel adhesive compositions of the present invention may be coated onto a variety of substrates, resist blocking upon being supplied as a roll-good, and exhibit a wide range of bond strengths, amenable to a variety of cold seal bonding applications.

BACKGROUND OF THE INVENTION

A "cohesive adhesive" or "cold seal" is an adhesive which is nontacky to the touch, yet adheres to itself with pressure. Cold seals are employed for a variety of uses, particularly in various packaging applications such as for food (i.e. flexible packaging for candy wrappers, chips etc.), sterilizable medical packaging, self-seal and tamper evident envelopes, banding for paper money, napkins, and clothing; and protective packaging such as fold over "blister" packages for hardware and small parts. Additionally, cold seal adhesives have found utility as anti-skid coatings and for release-paper free tapes such as tabless diaper tapes.

Natural latex based products have dominated the cold seal market for quite some time, since natural latex is inherently cohesive. Natural latex based cold seals have several deficiencies. For example, in the medical packaging area, natural latex has been identified as a skin sensitizer due to it containing certain proteins. Natural latex is also susceptible to aging effects such as yellowing and changes in the bond strength because of oxidation. Another deficiency of natural latex relates to the effect of irradiation, which is required for the sterilization of packaged medical bandages and devices. Irradiation causes the natural latex to crosslink, significantly changing the bond properties.

Certain hot melt adhesives have also found utility as cold seals. EP 531618 published Mar. 17, 1993 teaches cohesive cold seal compositions which include about 60 to about 95 parts by weight of an amorphous polyalphaolefin (APAO) polymer and about 1 to 30 parts of a crystalline aliphatic hydrocarbon wax. Exemplified are compositions based on REXTAC and VESTOPLAST APAO derived from Ziegaler-Natta catalysis. Such polyalphaolefins characteristically have a relatively broad polydispersity (Mw/Mn). Further, Rextac 2280 and Rextac 2315 are ethylene-propylene copolymers containing relatively low concentrations of ethylene. These APAO based compositions are compounded and disadvantageously exhibit poor self seal properties and low peel strengths.

Homogeneous linear and substantially linear ethylene polymers are prepared using single-site or metal locene catalysts. Homogeneous ethylene/α-olefin interpolymers differ from APAO, with regard to homogeneity, molecular weight distribution ($M_w/M_n$), as well as comonomer (α-olefin) content.

Tse et al., U.S. Pat. No. 5,530,054, claims a hot melt adhesive composition consisting essentially of: (a) 30–70 weight percent of a copolymer of ethylene and about 6 to about 30 ) weight percent of a $C_4$ to $C_{20}$ α-olefin produced in the presence of a catalyst composition comprising a metallocene and an alumoxane and having an $M_w$ of from about 20,000 to about 100,000; and (b) a hydrocarbon tackifier which is selected from a recited list. Exemplified are compositions consisting of 45 weight percent of ethylene/butene-1 copolymer having a specific gravity of either 0.898 g/cm$^3$ or 0.901 g/cm$^3$.

Tse et al, U.S. Pat. No. 5,548,014, claims a hot melt adhesive composition comprising a blend of ethylene/α-olefin copolymers wherein the first copolymer has a $M_w$ from about 20,000 to about 39,000 and the second copolymer has a $M_w$ from about 40,000 to about 100,000. Each of the hot melt adhesives exemplified comprises a blend of copolymers, contains 45 weight percent copolymer, with at least one of the copolymers having a polydispersity greater than 2.5. Furthermore, the lowest density copolymer exemplified has a specific gravity of 0.894 g/cm$^3$.

Lakshmanan et al., U.S. Pat. No. 5,397,843, teaches blended polymer compositions comprising an admixture of a copolymer of ethylene and an α-olefin and an amorphous polypropylene and/or amorphous polyolefin, or mixtures thereof. The single ethylene and α-olefin exemplified, FLEXOMER 9042, is described as having a 1-butene content of 15 weight percent, a melt index of 5.0 g/10 minutes, a crystallinity level of 26 percent and a density of 0.900 g/cm$^3$.

Hence, single-site catalyzed or metallocene polyolefins have found utility for use in hot melt adhesive compositions. However, the hot melt adhesives exemplified in Tse et al. and Lakshmanan et al. employ relatively high density metallocene polyolefins causing such compositions to be unsuitable for use in cohesive cold seals.

Industry would find advantage in cold seal compositions that overcome the disadvantages of the natural latex and amorphous polyalphaolefin based compositions.

SUMMARY OF THE INVENTION

The present invention is a cold seal composition having certain rheological properties. The cold seal composition is characterized as having a storage modulus (G') at 25° C. ranging from about 1×10$^6$ dynes/cm$^2$ to about 1×10$^9$ dynes/cm$^2$, and preferably ranging from about 1×10$^7$ dynes/cm$^2$ to about 8.5×10$^8$ dynes/cm$^2$.

In one embodiment, the present invention is a hot melt cold seal comprising from about 10 wt-% to 100 wt-% of at least one homogeneous ethylene/α-olefin interpolymer. Accordingly, the present invention provides formulated cold seal compositions as well as uncompounded compositions, consisting entirely of metallocene or single-site catalyzed polyolefin(s) exhibiting improved sealing and bonding characteristics. The polymer preferably has a melt index ranging from about 200 g/10 min. to about 2000 g/10 min. and a density ranging from about 0.855 g/cm$^3$ to about 0.880 g/cm$^3$. Alternatively, the cold seal composition may comprise a blend of metallocene polyolefins, wherein the blend of polyolefins has the previously described melt index and density characteristics.

In another embodiment, the cold seal composition comprises from about 30 wt-% to about 80 wt-% of a single-site catalyzed metallocene polyolefin in combination with a wax and/or tackifier.

The present invention also embodies a variety of articles wherein the novel adhesive composition of the present invention is coated onto a substrate. Once coated the adhesive composition resists blocking upon being supplied as a roll-good and provides a wide range of self-sealing bond strengths at room temperature. Further, the adhesive of the present invention can be formulated to be substantially entirely saturated, providing excellent oxidative resistance.

BRIEF DESCRIPTION OF THE FIGURE

The FIGURE depicts the theological properties of cold seal compositions according to the invention.

DETAILED DESCRIPTION OF THE INVENTION

The cold seal composition of the present invention exhibits certain rheological characteristics as depicted in the FIGURE. Accordingly, the cold seal composition is characterized as having a storage modulus (G') at 25° C. ranging from about $1 \times 10^6$ dynes/cm$^2$ to about $1 \times 10^9$ dynes/cm$^2$. Preferably, the cold seal composition exhibits a storage modulus (G') at 25° C. ranging from about $1 \times 10^7$ dynes/cm$^2$ to about $8.5 \times 10^8$ dynes/cm$^2$ and more preferably from about $1 \times 10^7$ dynes/cm$^2$ to about $8 \times 10^8$ dynes/cm$^2$. As the G' approaches the upper limit, the tan δ is preferably greater than about 0.15. At a G' of greater than about $8.5 \times 10^8$ dynes/cm$^2$, the composition tends not to seal at pressures ranging from 10 psi to 100 psi. On the other hand, when the storage modulus is less than about $1 \times 10^7$ dynes/cm$^2$, the composition is pressure sensitive to the extent that at high coat weights the composition tends to block to lacquer coated surfaces after being coated and wound onto a roll.

Homogeneous linear and substantially linear ethylene polymers are prepared using single-site or metallocene catalysts. Homogeneous ethylene polymers are characterized as having a narrow molecular weight distribution and a uniform short-chain branching distribution. In the case of substantially linear ethylene polymers, such homogeneous ethylene polymers are further characterized as having long chain branching. Substantially linear ethylene polymers are commercially available from The Dow Chemical Company as Affinity™ polyolefin plastomers, which are produced using Dow's Insite™ technology. Homogeneous linear ethylene polymers are available from Exxon Chemical Company under the trade name Exact® plastomers.

The cold seal composition of the present invention is a thermoplastic composition comprising at least one homogeneous ethylene/α-olefin interpolymer which is an interpolymer of ethylene and at least one $C_3$–$C_{20}$ α-olefin. The term "interpolymer" is used herein to indicate a copolymer, or a terpolymer, or a higher order polymer. That is, at least one other comonomer is polymerized with ethylene to make the interpolymer.

The homogeneous ethylene/α-olefin interpolymer is a homogeneous linear or substantially linear ethylene/α-olefin interpolymer. By the term "homogenous", it is meant that any comonomer is randomly distributed within a given interpolymer molecule and substantially all of the interpolymer molecules have the same ethylene/comonomer ratio within that interpolymer. The melting peak of homogeneous linear and substantially linear ethylene polymers, as obtained using differential scanning calorimetry, will broaden as the density decreases and/or as the number average molecular weight decreases. However, unlike heterogeneous polymers, when a homogeneous polymer has a melting peak greater than 115° C. (such as is the case of polymers having a density greater than 0.940 g/cm$^3$), it does not additionally have a distinct lower temperature melting peak.

In addition or in the alternative, the homogeneity of the polymer may be described by the SCBDI (Short Chain Branching Distribution Index) or CDBI (Composition Distribution Breadth Index), which are defined as the weight percent of the polymer molecules having a comonomer content within 50% of the median total molar comonomer content. The SCBDI of a polymer is readily calculated from data obtained from techniques known in the art, such as, for example, temperature rising elution fractionation (abbreviated herein as "TREF"), which is described, for example, in Wild et al., Journal of Polymer Science, Poly. Phys. Ed., Vol. 20, p. 441 (1982), in U.S. Pat. No. 4,798,081 (Hazlitt et al.), or in U.S. Pat. No. 5,089,321 (Chum et al.). The SCBDI or CDBI for the homogeneous ethylene/α-olefin interpolymers useful in the invention are preferably greater than 50%, more preferably greater than 70%, with SCBDI's and CDBI of greater than 90% being easily attained.

Homogeneous ethylene/α-olefin interpolymers differ from amorphous polyolefins also described as amorphous polyalphaolefins (APAO), with regard to homogeneity, molecular weight distribution ($M_w/M_n$), as well as comonomer (α-olefin) content. APAO's are homopolymers, copolymers, and terpolymers of $C_2$–$C_8$ α-olefins which are typically polymerized by means of processes which employ Ziegler-Natta catalysts, resulting in a relatively broad molecular weight distribution, typically greater than 4. In contrast, the homogeneous ethylene/α-olefin interpolymers useful in the inventive adhesive composition are characterized as having a narrow molecular weight distribution. The homogeneous ethylene/α-olefins have a $M_w/M_n$ of less than 4, preferably less than 3, more preferably from 1.5 to 2.5, even more preferably from 1.8 to 2.2, and most preferably about 2.0. Further, whereas amorphous polyolefins produced from Ziegler-Natta catalysis typically have an (α-olefin concentration greater than 50 wt-%, homogeneous ethylene/α-olefin interpolymers useful in the present invention are predominantly ethylene, having a greater ethylene content than comonomer content.

Substantially linear ethylene interpolymers are homogeneous interpolymers having long chain branching. Due to the presence of such long chain branching, substantially linear ethylene interpolymers are further characterized as havin(g a melt flow ratio ($I_{10}/I_2$) which may be varied independently of the polydispersity index, and the like, the molecular weight distribution $M_w/M_n$. This feature accords substantially linear ethylene polymers with a high degree of processability despite a narrow molecular weight distribution.

It is noted that substantially linear interpolymers useful in the invention differ from low density polyethylene prepared in a high pressure process. In one regard, whereas low density polyethylene is an ethylene homopolymer having a density of from 0.900 g/cm$^3$ to 0.935 g/cm$^3$, the homogeneous linear and substantially linear interpolymers useful in the invention require the presence of a comonomer to reduce the density to the range of from 0.855 g/cm$^3$ to 0.910 g/cm$^3$.

The long chain branches of substantially linear ethylene interpolymers have the same comonomer distribution as the interpolymer backbone and can be as long as, or about the same length as the length of the interpolymer backbone. When a substantially linear ethylene/α-olefin interpolymer is employed in the practice of the invention, such interpolymer will be characterized as having an interpolymer backbone substituted with from 0.01 to 3 long chain branches per 1000 carbons. Methods for determining the amount of long chain branching present, both qualitatively and quantitatively, are known in the art.

The molecular weight of the ethylene/α-olefin interpolymer will be selected on the basis of the desired performance attributes of the cold seal composition. Typically, however, the ethylene/α-olefin interpolymer will preferably have a number average molecular weight of at least 3,000, preferably at least 5,000. Typically, the ethylene/α-olefin interpolymer will preferably have a number average molecular weight of no more than 100,000, more preferably no more than 60,000, and even more preferably less than 40,000.

Ultra-low molecular weight ethylene/α-olefin interpolymers are either ethylene homopolymers or interpolymers of ethylene and a $C_3$–$C_{20}$ α-olefin. Such interpolymers are surmised to be particularly useful as diluents in combination with higher molecular weight metallocene polyolefins and for low application temperature (<135° C.) applied compositions. When the ethylene/α-olefin interpolymer has an ultra-low molecular weight, and the like, a number average molecular weight less than 11,000, the ethylene/α-olefin interpolymer leads to a low polymer viscosity but is characterized by a peak crystallization temperature which is greater than that of corresponding higher molecular weight materials of the same density. The ultra-low molecular weight ethylene/(α-olefin interpolymers will have a number average molecular weight less than about 6000, preferably less than about 5000. Such homogeneous interpolymers will typically have a number average molecular weight of at least about 800, preferably at least about 1300.

The density of the ethylene/α-olefin interpolymer will likewise be selected on the basis of the desired performance attributes of the cold seal compositions. In the case wherein the ethylene/α-olefin interpolymer is compounded with additional ingredients such as waxes, plasticizers, and tackifiers, the ethylene/α-olefin interpolymer will have a density of at least 0.855 g/cm$^3$, preferably at least about 0.860 g/cm$^3$. Typically, the ethylene/α-olefin interpolymer will have a density less than about 0.890 g/cm$^3$, preferably less than about 0.885 g/cm$^3$, more preferably less than about 0.880 g/cm$^3$, and even more preferably less than about 0.875 g/cm$^3$.

In the case of compounded compositions, the ethylene/α-olefin interpolymer will be present in the cold seal compositions of the invention in an amount of at least about 10 wt-%, and typically in an amount of at least about 20 wt-%, preferably in an amount of at least about 30 wt-%, and more preferably in an amount of about 40 wt-%. At amounts less than 10 wt-%, the composition is disadvantageously brittle and tends to lack sufficient cohesive strength. Advantageously, the ethylene/α-olefin interpolymer may be 100 wt-% of the cold seal composition of the invention, eliminating the need to further compound the polymer. Typically, however, the ethylene/α-olefin interpolymer is present in an amount of not more than 80 wt-%, and preferably less than about 70 wt-%.

The homogeneous linear or substantially linear interpolymer preferably has a melt index (MI) ranging from about 200 to 2000 g/10 min., more preferably ranging from about 300 to about 1500 g/10 min., and most preferably ranging from about 400 to about 1200 g/10 min. For uncompounded cold seal compositions, the ethylene/α-olefin interpolymer most preferably has a density between about 0.860 g/cm$^3$ and 0.880 g/cm$^3$ in combination with a melt index between about 400 and about 600.

In another embodiment, a first homogeneous ethylene/α-olefin interpolymer may be blended with a second homogeneous ethylene/α-olefin interpolymer, wherein the first and second interpolymers differ in number average molecular weight by at least about 5000, preferably at least about 10,000, and more preferably at least about 20,000. In addition or in the alternative, the first homogeneous ethylene/(α-olefin interpolymer may be blended with a second homogeneous ethylene/α-olefin interpolymer, wherein the first and second interpolymers differ in density by at least about 0.005 g/cm$^3$, preferably by at least about 0.01 g/cm$^3$. In this embodiment, as the density differential increases, the relative proportion of the higher density interpolymer will typically decrease, as the increased levels of crystallinity would otherwise tend to decrease storage modulus at 25° C. and probe tack to levels which would render them unsuitable for use as cold seals.

In one embodiment, the cold seal composition will comprise a blend of two homogeneous ethylene/α-olefin, the first interpolymer having a density of about 0.870 g/cm$^3$ or less and the second interpolymer having density greater than about 0.900 g/cm$^3$. In this instance, the homogeneous ethylene/(α-olefin blend will fall within the density and MI preferred ranges previously described.

In addition to the homogeneous ethylene/α-olefin interpolymer, the cold seal adhesive of the present invention may further comprise at least one block copolymer present in an amount ranging from about 1 wt-% to about 40 wt-% and preferably from about 2 wt-% to about 30 wt-%. At 1 wt-%, the effect is subtle but detectable. At concentrations below 1 wt-% the effect of the block copolymer tends to be so subtle that it is difficult to detect with most adhesive performance testing. At concentrations greater than about 40 wt-%, the viscosity tends to be too high for the majority of adhesive applications.

A wide variety of block copolymers are useful in the present invention including A-B-A triblock structures, A-B diblock structures, $(A-B)_n$ radial block copolymer structures, as well as branched and grafted versions of such, wherein the A endblock is a non-elastomeric polymer block, typically comprising polystyrene and/or vinyl, and the B block is an unsaturated conjugated diene or hydrogenated version thereof. In general, the B block is typically isoprene, butadiene, ethylene/butylene (hydrogenated butadiene), ethylene/propylene (hydrogenated isoprene), and mixtures thereof. Commercial embodiments include the Kraton® D and G series block copolymers, available from Shell Chemical Company (Houston, Tex.), Europrene® Sol T block copolymers available from EniChem (Houston, Tex.), Vector® block copolymers available from Exxon (Dexco) (Houston, Tex.), as well as others.

In general, block copolymers range in A block (styrene or vinyl) content from 0, as in the case of multi-arm (EP)n$^8$ 100% diblock polymers, to about 50 wt-%. Typically, the non-elastomeric A block concentration ranges from about 5 wt-% to about 45 wt-% with respect to the weight of the block copolymer. Block copolymers also range in diblock contents from 0, wherein the block copolymer is 100% coupled, to 100% diblock, as previously mentioned. preferably from about 0 to about 50% and most preferably from about 0% to about 30%.

The preferred diblock content of the block copolymer depends on the selection of the homogeneous ethylene/α-olefin. When employed with a homogeneous ethylene/α-olefin having a melt index greater than about 500 g/10 min., preferably the block copolymer is predominantly triblock, having a low diblock content, less than 50 wt-% with respect to the weight of the block copolymer. For this embodiment the block copolymer contributes significantly to the cohesive strength of the adhesive composition. Alternatively, when employing a homogeneous ethylene/α-olefin having a melt index less than about 300 g/10 min., increasingly higher concentrations of diblock may be employed since the adhesive strength is contributed primarily by the homogeneous ethylene/α-olefin, rather than by the formation of styrene domains by the block copolymer.

The molecular weight of a block copolymer may be related to its solution viscosity at 77° F. of a given weight of polymer in toluene. The amount of block copolymer employed for determining the solution viscosity depends on the molecular weight. For the higher molecular weight block copolymers, the solution viscosity may be expressed as a function of a 10 wt-% or 15 wt-% block copolymer solution, whereas for more conventional and lower molecular weight block copolymers, a 25 wt-% block copolymer solution is employed. For 10 wt-% or 15 wt-% the range of solution viscosity may be from about 300 cPs to about 2000 cPs at about 177° C. For a 25 wt-% block copolymer solution, the solution viscosity may range from about 100 to about 100,000 cPs, preferably from about 200 to about 50,000 cPs, more preferably from about 200 to about 25,000 and most preferably from about 200 to about 10,000 cPs. Solution viscosities may also be reported at a plasticized polymer concentration of 25 wt-%. Hence, the molecular weight of the block copolymer determines the most convenient and most accurate measurement method.

Preferably, the block copolymer employed in the adhesive composition of the present invention is substantially fully hydrogenated in which the midblock is typically ethylene/butylene, ethylene/propylene, or mixtures thereof. Hydrogenated block copolymers tend to be most compatible. Further, the addition of such block copolymers does not diminish the outstanding thermal stability contributed by the homogeneous ethylene/α-olefin. The majority of commercially available hydrogenated block copolymers are predominantly linear. Branched versions such as Kraton® GRP-69A having a styrene-ethylene/butylene-styrene backbone with isoprene side chains, as well as Kraton® G1730, an S-EP-S-EP block copolymer having a terminal ethylene-propylene block rather than terminal polystyrene are most useful for increasing tack. The styrene content of the hydrogenated block copolymers typically varies from about 5 wt-% to about 40 wt-% and preferably from about 10 wt-% to about 30 wt-% with respect to the weight of the block copolymer The cold seal composition of the present invention may further comprise one or more interpolymers of ethylene having at least one comonomer selected from the group consisting of vinyl esters of a saturated carboxylic acid wherein the acid moiety has up to 4 carbon atoms, unsaturated mono- or dicarboxylic acids of 3 to 5 carbon atoms, a salt of the unsaturated acid, esters of the unsaturated acid derived from an alcohol having 1 to 8 carbon atoms, and mixtures thereof. Terpolymers of ethylene and these comonomers are also suitable. Ionomers, which are completely or partially neutralized copolymers of ethylene and the acids described above, are discussed in more detail in U.S. Pat. No. 3,264,272. In addition, terpolymers of ethylene/vinyl acetate/carbon monoxide or ethylene/methyl acrylate/carbon monoxide containing up to 15 weight percent carbon monoxide may also be employed.

The ethylene to unsaturated carboxylic comonomer weight ratio is preferably from 95:5 to 40:60, more preferably from 90:10 to 45:50, and even more preferably from 85:15 to 60:40. The melt index ($I_2$ at 190° C.) of these modifying interpolymers of ethylene may range from 0.1 to 150, preferably from 0.3 to 50, and more preferably from 0.7 to 10 g/10 min.

Suitable ethylene/unsaturated carboxylic acid, salt and ester interpolymers include ethylene/vinyl acetate (EVA) including, but not limited to, the stabilized EVA described in U.S. Pat. No. 5,096,955, incorporated herein by reference; ethylene/acrylic acid (EEA) and its ionomers; ethylene/methacrylic acid and its ionomers; ethylene/methyl acrylate; ethylene/ethyl acrylate; ethylene/isobutyl acrylate; ethylene/n-butyl acrylate; ethylene/isobutyl acrylate/methacrylic acid and its ionomers; ethylene/n-butyl acrylate/methacrylic acid and its ionomers; ethylene/isobutyl acrylate/acrylic acid and its ionomers; ethylene/n-butyl acrylate/acrylic acid and its ionomers; ethylene/methyl methacrylate; ethylene/vinyl acetate/methacrylic acid and its ionomers; ethylene/vinyl acetate/acrylic acid and its ionomers; ethylene/vinyl acetate/carbon monoxide; ethylene/methacrylate/carbon monoxide; ethylene/n-butyl acrylate/carbon monoxide; ethylene/isobutyl acrylate/carbon monoxide; ethylene/vinyl acetate/monoethyl maleate; and ethylene/methyl acrylate/monoethyl maleate. Particularly suitable copolymers are EVA; EAA; ethylene/methyl acrylate; ethylene/isobutyl acrylate; and ethylene/methyl methacrylate copolymers and mixtures thereof.

As used herein, the term "tackifier" means any of the compositions described below which are useful to impart tack to the hot melt adhesive composition. ASTM D-1878-61T defines tack as "the property of a material which enables it to form a bond of measurable strength immediately on contact with another surface".

In general terms, tackifying resins are useful in the cold seal compositions of the invention. Tackifying resins comprise resins derived from renewable resources such as rosin derivatives including wood rosin, tall oil, gum rosin; rosin esters, natural and synthetic terpenes, and derivatives of such. Aliphatic, aromatic or mixed aliphatic-aromatic petroleum based tackifiers are also useful in the cold seal compositions of this invention. Representative examples of useful hydrocarbon resins includes alpha-methyl styrene resins, branched and unbranched $C_5$ resins, $C_9$ resins, $C_{10}$ resins, as well as styrenic and hydrogenated modifications of such. Tackifying resins range from being a liquid at 37° C. to having a ring and ball softening point of about 135° C. Solid tackifying resins with a softening point greater than about 80° C., more preferably with a softening point gtreater than about 100° C. are preferred.

The cold seal composition of the invention may comprise from up to about 75 wt-% of a tackifying resin. Typically, and particularly when it is desired to employ less than about 80 wt-% of the polymer, the cold seal composition will comprise from about 10 wt-% to about 70 wt-%, more preferably from about 20 wt-% to about 60 wt-% tackifier.

In the alternative, in cases where it is desirable to employ at least about 30 wt-% of the homogeneous ethylene/α-olefin interpolymer, the present invention advantageously provides cold seal compositions containing minimal tackifier. For such embodiments the cold seal composition of the present invention comprises less than about 30 wt-% tackifier, preferably less than about 25 wt-% tackifier, more preferably less than about 20 wt-% tackifier, and most preferably less than about 15 wt-% tackifier. In such instances, cold seal compositions containing less than about 10 wt-% tackifier, and even cold seal having no tackifier, exhibit adequate hot tack.

For the cold seal composition of the invention, the preferred tackifying resin is predominantly aliphatic. Commercially available tackifying resins for use in the present invention include ESCOREZ 5000 series hydrogenated dicyclopentadiene hydrocarbon resins available from Exxon Chemical Company (Houston, Tex.) and EASTOTAC series cycloaliphatic hydrocarbon resins available in various degrees of hydrogenation from Eastman Chemical (Kingsport, Tenn.).

Waxes may be usefully employed in the cold seal compositions of the present invention, particularly to increase blocking resistance. Waxes are commonly used to modify the viscosity and reduce tack at concentrations up to about 30 wt-%, preferably from about 3 wt-% to about 20 wt-% and most preferably from about 3 wt-% to about 5 wt-%. At concentrations greater than about 30 wt-%, the wax tends to disadvantageously hinder the ability of the cold seal composition to seal. Waxes useful in the cold seal compositions of the present invention range in melt point from about 80° C. to about 120° C. and include paraffin waxes, microcrystalline waxes, Fischer-Tropsch waxes, polyethylene and by-products of polyethylene wherein $M_w$ is less than about 3000. Examples of commercially available waxes include Bareco C-4040, an ethene homopolymer and PX-100, a Fischer-Tropsch wax, both available from Bareco Products (Rockhill, S.C.).

Also suitable are ultra-low molecular weight ethylene/(α-olefin interpolymers having a density greater than about 0.920 g/cm$^3$ prepared using a constrained geometry catalyst, and may be referred to as homogeneous waxes. Such homogeneous waxes, as well as processes for preparing such homogeneous waxes, are set forth in the examples below. Homogeneous waxes, in contrast to paraffinic waxes and crystalline ethylene homopolymer or interpolymer waxes, will have a $M_w/M_n$ of from about 1.5 to about 2.5, preferably from about 1.8 to about 2.2.

Homogeneous waxes will be either ethylene homopolymers or interpolymers of ethylene and a $C_3$–$C_{20}$ α-olefin. The homogeneous wax will have a number average molecular weight less than about 6000, preferably less than about 5000. Such homogeneous waxes will typically have a number average molecular weight of at least about 800, preferably at least about 1300.

Homogeneous waxes lead to a low polymer and formulation viscosity, but are characterized by peak crystallization temperatures which are greater than the peak crystallization temperatures of corresponding higher molecular weight materials of the same density. In hot melt cold seal applications, the increase in peak crystallization temperature translates to an increased heat resistance, and the like, improved creep resistance, and improved shear adhesion failure temperatures (SAFT).

An incremental amount of other ingredients such as other thermoplastic polymers and liquid plasticizers may be usefully employed in the present invention provided the resulting adhesive composition exhibits the required rheological characteristics. As is known in the art, various other components can be added to modify the tack, color, odor, etc., of the cold seal thermoplastic composition. Additives such as antioxidants such as hindered phenolics (Irganox™ 1010, Irganox™ 1076), phosphites (for example, Irgafos™ 168), antiblock additives, pigments, and fillers, can also be included in the formulations. It is generally preferred that the additives should be relatively inert and have negligible or synergistic effects upon the properties contributed by the essential ingredients.

The cold seal compositions of the invention may be prepared by standard melt blending procedures. In particular, the first polymer(s), tackifier(s), and optional plasticizer(s) may be melt blended at an elevated temperature (from 150° C. to 200° C.) under an inert gas blanket until a homogeneous mix is obtained. Any mixing method producing a homogeneous blend without degrading the hot melt components is satisfactory, such as through the use of a heated vessel equipped with a stirrer. Alternatively, the homogeneous ethylene/α-olefin interpolymer, optional tackifier(s) and optional plasticizer(s) may be provided to an extrusion coater for application to the substrate.

When the cold seal composition comprises a blend of two or more ethylene/α-olefin interpolymers, it will be preferred to prepare the cold seal compositions using a dual reactor configuration, with one of the polymers being produced in the first reactor, the other of the polymers being produced in a second reactor, and the tackifier(s) and optional plasticizer(s) being optionally provided, typically at a point after the second reactor, via a side-arm extruder. In this embodiment, cold seal compositions can be provided in forms such as pellets, pillows, or any other desired configuration. Examples of such a process which may be adapted in accordance with the teachings of this disclosure to prepare blends of a homogenous linear (higher molecular weight or ultra-low molecular weight) or substantially linear ethylene/ α-olefin interpolymer, wax, and optional tackifier, are disclosed in WO 94/00500 and WO 94/01052.

The viscosity of the hot melt cold seal compositions of the present invention varies widely and will be chosen based on the intended method of application. For slot coating, the viscosity may be as high as 100,000 cPs at the coating temperature, whereas for pattern coating, gravure coating and roll coating the viscosity is typically less than about 5,000 cPs at the coating temperature. The application temperature ranges from about 100° C. to about 180° C., with lower application temperatures being preferred.

The cold seal composition of the present invention can be cast from solution or advantageously applied molten by any of a variety of hot melt coating processes well known in the art including knife coating, roll coating, slot coating, gravure coating, curtain coating, etc onto a substrate. Useful coat weights range from about 0.01 g/in$^2$ to about 0.1 g/in$^2$. For some applications, for example when the cold seal is applied to an uneven substrate, thicker cold seal coatings are not uncommon. However, in most instances, to reduce cost, lower coating thicknesses ranging from about 0.2 to 1 mil are preferred.

A "cohesive adhesive" or "cold seal" composition is essentially non-tacky to the touch, yet adheres to itself. The coated substrates may be bonded to themselves at ambient temperatures at pressures ranging from about 5 to 100 psi (for 1 second), preferably from about 5 to about 60 psi, and more preferably from about 5 to about 40 psi. Lower pressures are required when longer dwell times, in excess of 1 second, are employed. The peel strength may range from 0 to 2,000 g/linear inch, are preferably from about 50 to 1000 g/linear inch and more preferably from about 100 to about 500 g/linear inch for the majority of applications. The desired peel strength depends on the end-use application. For example, in the case of candy wrappers the cohesive cold seal bond strength should be equal to or greater than the tear strength of the wrapper itself. If the wrapper has very low tear strength the peel strength may be less than the detection limit of the measuring device employed. In contrast, for medical packaging applications peel strengths in excess of 1,000 g may be required to insure the packaging does not burst open under pressure, resulting in contamination of the medical device. Regardless of the peel strength, the cold seal bond preferably exhibits a smooth peel or fiber tearing bond, rather than a zippery peel.

The cold seal composition of the present invention may be coated onto a wide variety of substrates such as polymeric films and foils which in turn are used to package food and sterilizable medical device, self-seal and tamper evident envelopes, banding for paper money, napkins, and clothing; and protective packaging such as fold over "blister" packages for hardware and small parts. Additionally, cold seal adhesives have found utility as anti-skid coatings and for release-paper free tapes such as tabless diaper tapes.

The invention can be further illustrated by the following non-limiting examples.

EXAMPLES

Test Methods

1. Self-Seal Test

The adhesive compositions were coated onto standard copy paper with a Pamarco Precision Hand proofer using an 85Q Quadragravure engraved roller. The roller is specified to apply 34.6 CBM/in$^2$ of material. (CBM=cubic million micron) The coat weights were measured to verify the amount deposited. Coated sheets of paper were sealed adhesive side to adhesive side in a Sentinel press. The conditions used were room temperature sealing (78° F., 25° C.), 1 second dwell time, and variable pressure from 10 to 100 psi. The bond was then characterized in accordance with the following descriptions:

| Bond Rating | Description |
| --- | --- |
| 1. No Cling | Samples did not stick together, i.e. freely fall apart. |
| 2. Cling | Substrates stick together but a very small amount of force is required to pull apart. |
| 3. Cling/Zippery Peel | Same as "Cling" except accompanied by a zippery noise. "Zippery" denotes a stick-slip phenomena which often results in the generation of noise. |
| 4. Seal/Zippery Peel | Samples stick together and a reasonable amount of force is required to pull apart, accompanied by a zippery noise. |
| 5. Seal/Smooth Peel | Samples stick together and a reasonable amount of force is required to pull apart resulting in a smooth separation and no noise associated with debonding. |
| 6. Seal/Fiber tear | Samples stick together and paper fiber tearing results upon separating the sheets. |

For Examples 35 to 38, a pressure of 100 psi was employed, whereas for Example 39 the cold seal coated surfaces were bonded to each other with a pressure of 50 psi. The peel strength was determined by separating the bonded paper with an Instrumentor's Bench Peel Tester (Instrumentors Inc., Cleveland, Ohio) at a rate of 12 inches/minute, averaging the readings over 20 seconds.

2. Sentinel Press Blocking Test

The tendency of the samples to adhere to Flexcon release lacquer, 82-3-90017 was also characterized. A No. 6 Myer rod was used to apply the release lacquer onto medical grade kraft paper at a coat weight of 0.0054 grams/in$^2$. The adhesive coated copy paper, prepared in accordance with the Self Seal Test was pressed against the release-lacquer coated paper in a Sentinel Press for 1 second. The pressure was varied until either fiber tear occurred or 100 psi was reached. The same bond ratings as for the seal test were used.

3. Koehler Blocking Test

Examples 35 to 39 were also tested using the Koehler K 53000 IC Block Tester, (Koehler Instrument Company Inc., Bohemia, N.Y.). The samples were heat sealed to uncoated release paper as well as to the release lacquer coated paper at 120° F. and 50 psi for 16 hours.

4. Rlieology Testing

The storage modulus (G') and tan delta were determined in accordance with ASTM D4440-93. A test frequency of 10 radians/sec and a temperature ramp or step test was performed with a 10 mm diameter parallel plate test geometry with a gap of 1 to 4 mm.

5. Density is measured in accordance with ASTM D-792. The samples are annealed at ambient conditions for 24 hours before the measurement is taken.

6. Melt index ($I_2$), is measured in accordance with ASTM D-1238, condition 190° C./2.16 kg (formally known as "Condition (E)").

7. Molecular Weight is determined using gel permeation chromatography (GPC) on a Waters 150° C. high temperature chiomatographic unit equipped with three mixed porosity columns (Polymer Laboratories 103, 104, 105, and 106), operating at a system temperature of 140° C. The solvent is 1,2,4-trichlorobenzene, from which 0.3 wt-% solutions of the samples are prepared for injection. The flow rate is 1.0 mL/min. and the injection size is 100 microliters.

The molecular weight determination is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Word in Journal of Polymer Science, Polymer Letters, Vol. 6, (621) 1968, incorporated herein by reference) to derive the following equation:

$$M_{polyethylene} = a * (M_{polystyrene})b.$$

In this equation, a=0.4316 and b=1.0. Weight average molecular weight, $M_w$, is calculated in the usual manner according to the following formula: $M_w = \Sigma w_i * M_i$, where $w_i$ and $M_i$ are the weight fraction and molecular weight, respectively, of the ith fraction eluting from the GPC column.

8. Melt Viscosity is determined in accordance with the following procedure using a Brookfield Laboratories DVII+ Viscometer in disposable aluminum sample chambers.

The spindle used is a SC-27 hot-melt spindle, suitable for measuring viscosities in the range of from about 10 to about 100,000 centipoise. The sample is placed in the chamber, which is in turn inserted into a Brookfield Thermosel and locked into place. The sample chamber has a notch on the bottom that fits the bottom of the Brookfield Thermosel to ensure that the chamber is not allowed to turn when the spindle is inserted and spinning. The sample is heated to the desired temperature, with additional sample being added until the melted sample is about 1 inch (2.5 cm) below the top of the sample chamber. The viscometer apparatus is lowered and the spindle submerged into the sample chamber. Lowering is continued until brackets on the viscometer align on the Thermosel. The viscometer is turned on, and set to a shear rate which leads to a torque reading in the range of 30% to 60%. The reading is taken after about 30 minutes, or after the value has stabilized.

The synthesis of the ultra-low molecular weight polymers and waxes is described in WO 98/0360, published Jan. 29, 1998, incorporated herein by reference. Table I depicts the density and melt index or viscosity of the homogeneous ethylene/α-olefin interpolymers employed in the examples. The exemplified Polymers 1 to 8 are substantially linear ethylene-octene polymers.

TABLE I

| Designation | Density g/cm³ | Melt Index (g/10 min.) | Viscosity at 350° F. (cPs) |
|---|---|---|---|
| Polymer 1 | 0.870 | 1000 | |
| Polymer 2 | 0.859 | 1000 | |
| Polymer 3 | 0.870 | 500 | |
| Polymer 4 | 0.870 | 200 | |
| Polymer 5 | 0.870 | | 5000 |
| Polymer 6 | 0.864 | 200 | |
| Polymer 7 | 0.880 | | 5000 |
| Polymer 8 | 0.890 | | 1000 |

Examples 1 to 39 of Tables II and III depict several embodiments of cold seal compositions of the present invention based on metallocene or single-site catalyzed polyolefins. A broad concentration range of homogeneous ethylene/α-olefin interpolymers are employed ranging from 40 wt-% to 100 wt-% as depicted in Example 39. Although Polymer 7 (Example 28) and Polymer 8 (Example 27) do not possess the desired properties uncompounded, the properties can be enhanced with tackifier and wax, as depicted in Examples 30 and 31. Likewise, Example 7 employing Polymer 2 is not desirable due to its tendency to block. However, the applicants surmise that by decreasing the polymer concentration and adding some wax this disadvantage can be overcome. Further, Examples 35 and 36 are surmised to be suitable to form cold seal tapes which do not require the tape backing to be coated with lacquer.

TABLE II

| Example | Polymer | Tackifier | Wax | Coat Weight (g/m²) | Viscosity 350° F. | Test 1 Self-Seal Characterization | | Test 2 Sentinel Press Block Test | |
|---|---|---|---|---|---|---|---|---|---|
| | | | | | | Pressure (psi) | Bond Rating | Pressure (psi) | Bond Rating |
| Ex. 1 | 40% Polymer 1 | 55% E5380 | 5% PX-100 | 0.0149 | 1535 | 30<br>40 | 4<br>5 | 60–100 | 3 |
| Ex. 2 | 40% Polymer 3 | 55% E5400 | 5% PX-100 | 0.0191 | 2120 | 30<br>40<br>50 | 4<br>5<br>6 | 60–100 | 3 |
| Ex. 3 | 40% Polymer 4 | 55% E5400 | 5% PX-100 | | 1140 | 50–100 | 4 | 60–90 | 2 |
| Ex. 4 | 40% Polymer 3 | 60% E5400 | | | | 30–40 | 5 | 80–100 | 3 |
| Ex. 5 | 40% Polymer 1 | 55% E5400 | 5% PX-100 | 0.0084 | | 40–50 | 5 | 60–100 | 3 |
| Ex. 6 | 60% Polymer 1 | 30% E5400 | 10% PX-100 | | | 40<br>60–80 | 2<br>2 | 30–50<br>60–80 | 1<br>2 |
| Ex. 7 | 50% Polymer 2 | 50% E5400 | | 0.0157 | | 20<br>10<br>5 | 6<br>6<br>5 | 50–100 | 4 |
| Ex. 8 | 80% Polymer 1 | 20% E5400 | | | | 60–100 | 2 | 50–100 | 1 |
| Ex. 9 | 80% Polymer 3 | 20% E5400 | | | | 60–80 | 2 | 50–100 | 1 |
| Ex. 10 | 60% Polymer 1 | 20% E5400 | 20% PX-100 | | | 50<br>60–90 | 2<br>3 | 50–90<br>100 | 1<br>2 |
| Ex. 11 | 55% Polymer 3 | 40% Eastotac H-100-R | 5% PX-100 | 0.0121 | 4260 | 20–60 | 5 | 70–90 | 3 |
| Ex. 12 | 60% Polymer 3 | 30% Eastotac H-100-R | 10% PX-100 | 0.0122 | 4190 | 30–50<br>60–80 | 2<br>5 | 80–100 | 3 |
| Ex. 13 | 50% Polymer 3 | 30% Eastotac H-100-R | 20% PX-100 | 0.0103 | 2105 | 40–60<br>70–100 | 2<br>5 | 70–100 | 2 |
| Ex. 14 | 40% Polymer 3 | 40% Eastotac H-100-R | 20% PX-100 | 0.0137 | 1240 | 50–100 | 3 | 70–100 | 2 |
| Ex. 15 | 70% Polymer 3 | 20% Eastotac H-100-R | 10% PX-100 | | 6130 | 40–80<br>90 | 2<br>2 | 80–100 | 2 |
| Ex. 16 | 65% Polymer 3 | 24% Eastotac H-100-R | 11% PX-100 | 0.0132 | 4785 | 30–60<br>70–90 | 2<br>5 | 60–70<br>80–90 | 1<br>2 |
| Ex. 17 | 45% Polymer 3 | 35% Eastotac H-100-R | 20% PX-100 | | 1712 (1665) | 30–70<br>80–100 | 3<br>4 | 60–80<br>90–100 | 1<br>2 |
| Ex. 18 | 50% Polymer 3 | 45% Eastotac H-100-R | 5% PX-100 | 0.0105 | 3556 | 30–60<br>70–90 | 2<br>5 | | |
| Ex. 19 | 65% Polymer 3 | 30% Eastotac H-100-R | 5% PX-100 | | 6400 | 30–50<br>60–90 | 2<br>5 | 60–90 | 3 |
| Ex. 20 | 54.33% Polymer 3 | 38.83% Eastotac H-100-R | 11.83% PX-100 | | 3490 | 30–60<br>70–90 | 2<br>5 | 60–80<br>90 | 2<br>3 |

TABLE II-continued

| | | | | | | | | | |
|---|---|---|---|---|---|---|---|---|---|
| Ex. 21 | 57.5% Polymer 3 | 37.5% Eastotac H-100-R | 5% PX-100 | | 5400 | 30–50 60–90 | 5 6 | 60–90 | 3 |
| Ex. 22 | 56% Polymer 3 | 24% Eastotac H-100-R | 20% PX-100 | 0.0066 | 2885 | 30 40–90 | 2 2 | 60–80 90 | 1 2 |
| Ex. 23 | 45% Polymer 3 | 45% Eastotac H-100-R | 10% PX-100 | 0.0102 | 2265 | 30–50 60–90 | 3 4 | 60–90 | 3 |
| Ex. 24 | 45% Polymer 3 | 35% Eastotac H-100-R | 20% PX-100 | 0.0112 | 2610 (2510) | 30–90 80–90 | 3 2 | 60–70 | |
| Ex. 25 | 56% Polymer 3 | 24% Eastotac H-100-R | 20% PX-100 | 0.0171 | 3015 | 30–90 | 2 | 60–90 | 2 |
| Ex. 26 | 54.33% Polymer 3 | 38.83% Eastotac H-100-R | 11.83% PX-100 | 0.0096 | 3300 | 30–50 60–90 | 2 5 | 60–100 | 3 |
| Ex. 27 | 100% Polymer 8 | | | | | 70–100 | 1 | | |
| Ex. 28 | 100% Polymer 7 | | | | | 70–100 | 1 | | |
| Ex. 29 | 40% Polymer 1 | 60% Escorez 5400 | | 0.0122 | 1400 | 20 30–70 | 5 5 | 70–100 | 2 |
| Ex. 30 | 40 w % Polymer 8 | 60% Escorez 5400 | | | | 90–100 | 2 | | |
| Ex. 31 | 40 w % Polymer 7 | 60% Escorez 5400 | | | | 60–100 | 3 | 50–100 | 3 |
| Ex. 32 | 40% Polymer 1 | 60% Eastotac H-130-R | | | | | | 60–100 | 3 |
| Ex. 33 | 40% Polymer 5 | 60% Eastotac H-130-R | | | | | | 60–100 | 3 |
| Ex. 34 | 40% Polymer 3 | 55% Escorez 5400 | 5% PX-100 | | | 30–40 50 | 5 6 | | |
| Ex. 35 | 80% Polymer 3 | 20% Escorez 5400 | | 0.0116 | 10660 | 100 | 5 | | |
| Ex. 36 | 80% Polymer 1 | 20% Escorez 5400 | | 0.009 | 5840 | 100 | 5 | | |
| Ex. 37 | 55% Polymer 3 | 40% Escorez 5400 | 5% Bareco C-4040 | 0.0145 | 3700 | 100 | 6 | | |
| Ex. 38 | 65% Polymer 3 | 30% Escorez 5400 | 5% Bareco C4040 | 0.0194 | 6047 | 100 | 6 | | |
| Ex. 39 | 100% Polymer 3 | | | 0.008 | 16475 | 50 | 3 | | |
| Comp. A | 15% Vestoplast 608/75% Vestoplast 408 | | 10% Polywax 2000 | 0.004 | | 100 | 1 | | |
| Comp. B | 40% Rextac 2280/40% Rextac 2315 | 10% Wing-tack 95 | 10% Polywax 2000 | 0.004 | 2650 | 100 | 2 | | |

"PX-100" - Polywax 100
"E5380" - Escorez 5380

| Label | Paper | Test 3 Block Test Dow Release Lacquer | Multiweb Release Lacquer | Test 4 Peel Test |
|---|---|---|---|---|
| Ex. 35 | Slight; adhesive transfer | None | None | 240 ± 18 g |
| Ex. 36 | Slight; adhesive transfer | None | None | 215 ± 9 g |
| Ex. 37 | Severe blocking | None | Slicks, but no FT or transfer | 458 ± 193 g Paper Tear |
| Ex. 38 | Blocks; 30–50% FT | None FT or transfer | Slicks, but no Paper Tear | 310 ± 202 g |

TABLE II-continued

| | | |
|---|---|---|
| Ex. 39 | Cling | Less than 50 |
| Comp. A | | 0 g |
| Comp. B | | 3 g |

TABLE III

Peel Values of Example 11

| Sample | Seal Pressure (psi) | Avg Peel (grams) | Observation | Width (inches) | Actual Peel (grams/inch) |
|---|---|---|---|---|---|
| Ex. 11 | 20 | 71.0 | Legging | 1 | 71.0 |
| | 40 | 218.6 | Legging | 1 | 218.6 |
| | 60 | 339.9 | Legging | 1 | 339.9 |

The peel values of Example 11 were also evaluated. The peel strength is suitable for the packaging of IV tubing. Tapes having a paper backing coated with a cold seal composition are commonly employed for packaging medical devices. In the case of IV tubing, the tape is wrapped around bundles of IV tubing to reduce the volume of packaging required as well as the keep the tube from tangling. The cold seal composition forms sufficient bond strength with light pressure applied by hand.

What is claimed is:

1. A cold seal composition comprising from about 10 wt-% to 100% wt-% of at least one homogeneous linear or substantially linear ethylene/α-olefin interpolymer.

2. The cold seal composition of claim 1 wherein said composition has a storage modulus (G') at 25° C. ranging from about 1×10$^7$ dynes/cm$^2$ to about 8.5×10$^7$ dynes/cm$^2$.

3. The cold seal composition of claim 1 wherein the homogeneous linear or substantially linear ethylene/α-olefin interpolymer is present in an amount greater than about 30 wt-%.

4. The cold seal composition of claim 1 wherein the homogeneous linear or substantially linear ethylene/α-olefin interpolymer is present in an amount ranging from about 40 wt-% to about 80 wt-%.

5. The cold seal composition of claim 1 wherein the homogeneous linear or substantially linear ethylcne/α-olefini interpolymer has a melt index ranging from about 200 g/10 min. to about 2000 g/10 min.

6. The cold seal composition of claim 1 wherein the homogeneous linear or substantially lincar ethylene/α-olefiin interpolymer has a melt index ranging from about 300 g/10 min. to about 1500 g/10 min.

7. The cold seal composition of claim 1 wherein the homogeneous linear or substantially linear cthylene/α-olefin interpolymcr has a melt index ranging from about 400 g/10 min. to about 1200 g/10 min.

8. The cold seal composition of claim 1 wherein the polydispersity of the homogeneous linear or substantially linear ethylene/α-olefin interpolymer is less than 4.

9. The cold seal composition of claim 1 wherein the polydispersity of the homogeneous linear or substantially linear ethylene/α-olefin interpolymer is less than 2.5.

10. The cold seal composition of claim 1 wherein the density of the homogeneous linear or substantially linear ethylene/α-olefin interpolyrner ranges from about 0.855 g/cm$^3$ to about 0.890 g/cm$^3$.

11. The cold seal composition of claim 4 wherein said composition further comprises at least one tackifying resin.

12. The cold seal composition of claim 11 wherein the tackifying resin is present in an amount ranging from about 10 wt-% to about 70 wt-%.

13. The cold seal composition of claim 4 wherein said composition further comprises at least one wax.

14. The cold seal composition of claim 13 wherein the wax is present in an amount ranging from about 3 wt-% to about 20 wt-%.

15. The cold seal composition of claim 4 wherein said composition further comprises at least one polymer selected from the group consisting of block copolymers, ethylene-vinyl acetate, ethylene-methyl acrylate, ethylene-n butyl acrylate, and mixtures thereof.

16. A package, envelope or tape comprising a substrate coated with the cold seal composition of claim 1.

17. The package, envelope or tape of claim 16 wherein the coated substrate is bonded to itself forming a smooth peeling or substrate failing bond.

18. The package, envelope or tape of claim 17 wherein the force to separate the bond ranges from about 100 g to about 500 g/linear inch bond width.

19. A cold seal composition consisting essentially of one or more homogeneous linear or substantially linear ethylene/α-olefin interpolymer.

* * * * *

UNITED STATES PATENT AND TRADEMARK OFFICE
CERTIFICATE OF CORRECTION

PATENT NO. : 6,221,448 B1
DATED : April 24, 2001
INVENTOR(S) : Baetzold et al.

It is certified that error appears in the above-identified patent and that said Letters Patent is hereby corrected as shown below:

Column 1,
Line 54, "Ziegaler" should be -- Ziegler --.
Line 63, "metal locene" should be -- metallocene --.

Column 2,
Line 4, "30 )" should be -- 30 --.

Column 4,
Line 43, "havin(g" should be -- having --.

Column 6,
Line 4, "ethylene/(α -olefin" should be -- ethylene/α -olefin --.
Line 19, "ethylene/(α -olefin" should be -- ethylene/α -olefin --.
Line 56, "mentioned." should be -- mentioned, --.

Column 9,
Line 23, "ethylene/(α -olefin" should be -- ethylene/α -olefin --.

Column 12,
Line 4, "Rlieology" should be -- Rheology --.
Line 18, "chiomatographic" should be -- chromatographic --.

Column 16,
Table II, Ex.24, Bond Rating Column, "blank space" should be --1 --.

Column 15-16,
Table II-continued, Third Column, "Test 3 Block Test" should be -- Test 3 Koehler Block Test --.
Table II-continued, Ex. 37, Fourth Column, "Slicks," should be -- Sticks, --.
Table II-continued, Ex. 38, Third Column, "None FT or transfer" should be -- None --.
Table II-continued, Ex. 38, Fourth Column, "Slicks, but no Paper Tear" should be -- Sticks, but no FT or transfer --.
Table II-continued, Ex. 38, Fifth Column, "310 ± 202 g" should be -- 310 ± 202 g Paper Tear --.

Column 17-18,
Table II-continued, Fourth Column, "Less than 50, 0 g, 3 g" should be in Fifth Column, -- Less than 50, 0 g, 3 g --.
Line 34, "$8.5 \times 10^7$ dynes/cm$^2$" should be -- $8.5 \times 10^8$ dynes/cm$^2$ --.
Lines 44 and 45, "ethylcne/α -olefini" should be -- ethylene/α -olefin --.

UNITED STATES PATENT AND TRADEMARK OFFICE
CERTIFICATE OF CORRECTION

PATENT NO. : 6,221,448 B1
DATED : April 24, 2001
INVENTOR(S) : Baetzold et al.

It is certified that error appears in the above-identified patent and that said Letters Patent is hereby corrected as shown below:

Column 17, con't.
Line 49, "lincar" should be -- linear --.

Column 18,
Line 9, "cthylene/α -olefin" should be -- ethylene/α -olefin --.
Line 20, "interpolyrner" should be -- interpolymer --.

Signed and Sealed this

Twenty-ninth Day of April, 2003

JAMES E. ROGAN
*Director of the United States Patent and Trademark Office*